United States Patent [19]

Bell et al.

[11] 4,051,749

[45] Oct. 4, 1977

[54] CABLE INSULATION STRIPPING APPARATUS

[75] Inventors: Rex R. Bell; John W. Sandstrom, both of Dallas, Tex.

[73] Assignee: Integral Corporation, Dallas, Tex.

[21] Appl. No.: 650,908

[22] Filed: Jan. 21, 1976

[51] Int. Cl.² ............................................. H02G 1/12
[52] U.S. Cl. .................................................... 81/9.51
[58] Field of Search ................. 81/9.51, 9.5 A; 83/924

[56] References Cited

U.S. PATENT DOCUMENTS

| 2,956,717 | 10/1960 | Scharf | 81/9.51 |
| 3,638,518 | 2/1972 | Parker | 81/9.51 |

FOREIGN PATENT DOCUMENTS

| 470,777 | 5/1969 | Switzerland | 81/9.51 |

*Primary Examiner*—James L. Jones, Jr.

*Assistant Examiner*—Roscoe V. Parker
*Attorney, Agent, or Firm*—Kenneth R. Glaser

[57] ABSTRACT

Disclosed is ground supported automatically operated cable insulation stripping apparatus having a pair of cable clamping assemblies, one of which being adapted to substantially sever a portion of the cable insulation being removed and thereafter translated away from the other assembly to strip the so-severed portion. The clamping and unclamping of the cable is effected by cooperating jaw assemblies having mutually aligned semicircular recessed surface portions for gripping the cable, the jaw assemblies of the translatable cable clamping assembly additionally having cooperating cutting blades for severing the insulating casing, ejector pins carried by pin carrier frames of the clamping assemblies assisting in the ejection of the cable. A pneumatic system is disclosed for operating the apparatus.

2 Claims, 8 Drawing Figures

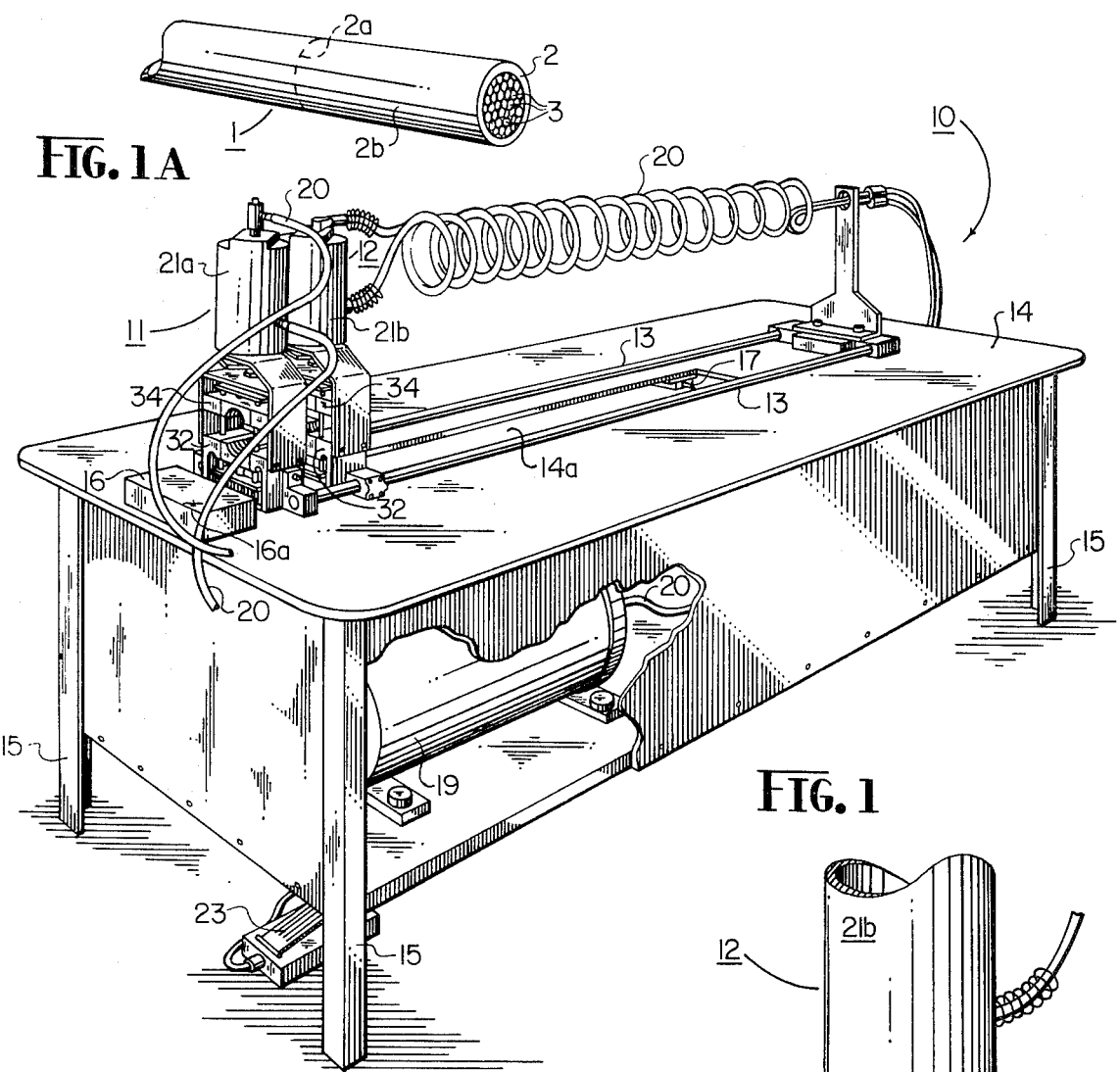
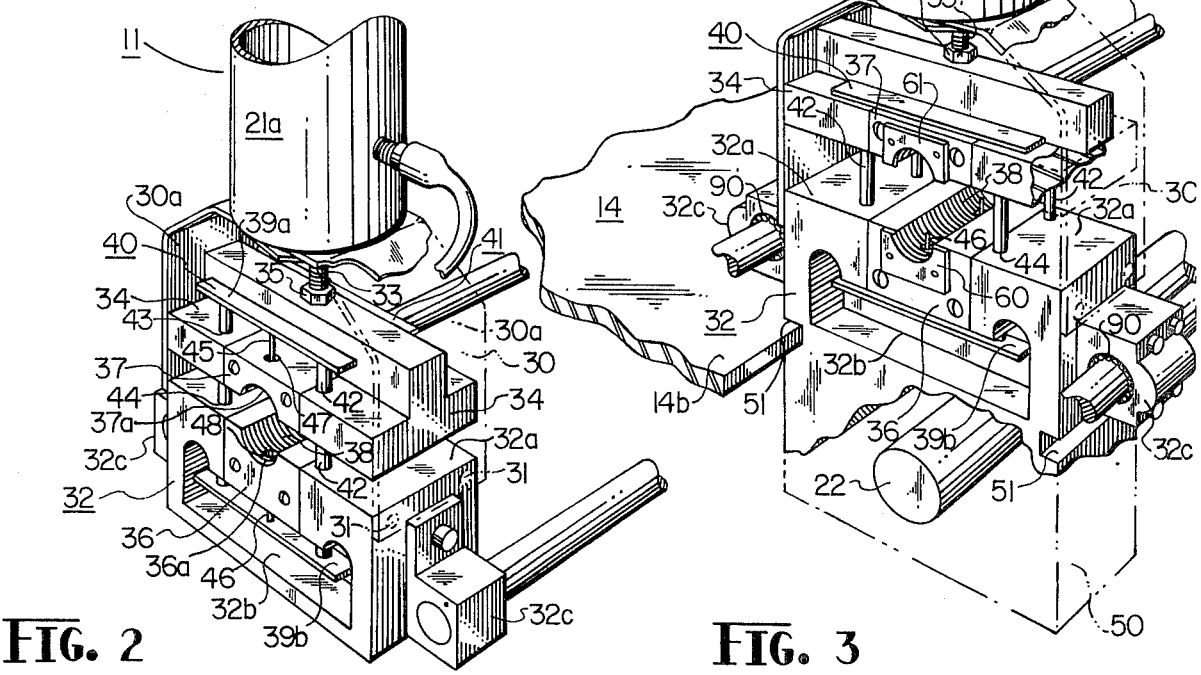

CABLE INSULATION STRIPPING APPARATUS

This invention relates to cable insulation stripping apparatus, and even more particularly to ground supported, automatic apparatus for stripping end segments of the insulated casing from a multiple wire strand electrical cable.

The transmission of electric power for heavy electrical equipment ordinarily requires the use of electrical cables of the type having multiple strands of individually insulated conductors disposed within the confines of an outer insulating casing consisting of one or more coaxial layers of insulation material with an electrostatic shield therebetween. Interconnection of the cable with the equipment, of course, requires that a suitable length of the outer casing be removed at the end of the cable in order to expose the conductors; and, as a result, various types of apparatus have been previously designed and used to effect this removal. For example, there are a wide variety of hand operated cutters or insulation strippers on the market; but these are generally unsuitable for the removal of insulating casings of large diameter cables due to the excessive weight and bulkiness of these cables, as well as the significant force required to effectively cut through and remove the outer casing. Thus, it is necessary to employ cable insulation stripping apparatus which is not only automatically, rather than manually, actuated, but which additionally supports the cables during the removal operation. Unfortunately, however, apparatus of this type which has been previously available is either too expensive to build or is not entirely satisfactory for all conditions of service.

It is therefore a principal object of the present invention to provide new and improved cable insulation stripping apparatus particularly suited for bulky or large diameter electrical cables.

It is another object of the invention to provide new and improved automatically actuated ground supported stripping apparatus for quickly and effectively removing a defined length of the outer casing from the end of a multiple strand electrical cable.

It is an even further object of the present invention to provide apparatus for the rapid and reliable removal of the outer insulating casing from electrical power cables of various diameters.

In accordance with these and other objects, the present invention is directed to automatic, ground supported apparatus for the removal of the cable insulating casing at one end thereof, the apparatus including a pair of cable clamping assemblies, one of which is stationary, the other one of which is sequentially actuated to initially sever a substantial thickness of the casing at one end of the clamped cable, and thereafter be transported away from the stationary assembly, thereby effectively stripping the substantially severed end of the casing to expose the conductors. As a unique feature thereof, each of the clamping assemblies includes a floating ejector pin frame which assists in freeing the cable from the respective clamping assemblies.

Additional features of the invention, as well as further objects and advantages thereof, will become more readily understood from the following detailed description of a preferred embodiment of the invention, taken in conjunction with the accompanying drawings, wherein like numerals refer to corresponding parts and wherein:

FIG. 1 is an overall perspective view of a preferred embodiment of the apparatus of the present invention;

FIG. 1A is an illustration of the end portion of a conventional electrical cable, the insulated casing of which is to be removed by the apparatus depicted in FIG. 1;

FIG. 2 is an enlarged perspective view of the stationary cable clamping assembly of the apparatus depicted in FIG. 1, the clamping jaws of which being depicted in their partially open position;

FIG. 3 is an enlarged perspective view of the reciprocally movable clamping assembly of the apparatus depicted in FIG. 1, the clamping jaws of which being depicted in their entirely open position.

Figure 4:
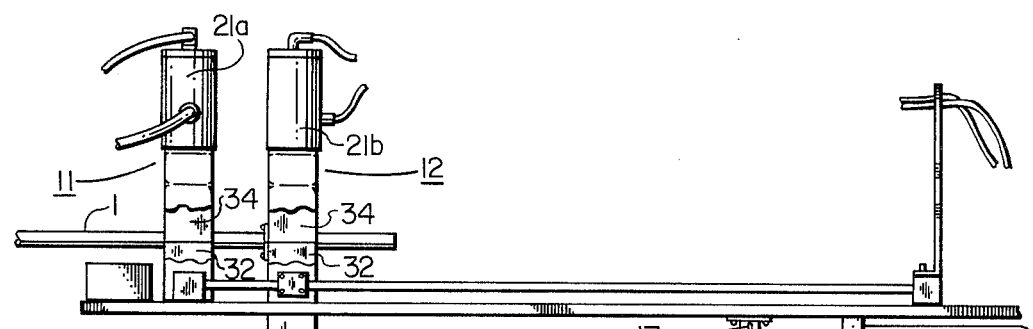
FIGS. 4 - 7 illustrate the sequential operation of the apparatus of the present invention.

The drawings are not necessary to scale, and in some instances portions have been exaggerated in order to more clearly emphasize specific features of the invention.

Referring now to the drawings, the end of a conventional electrical cable 1 is depicted in FIG. 1A and comprises multiple strands 3 of individually insulated conductors surrounded by an insulating casing 2. While the casing is depicted in the drawing as being of a single layer, it could also conventionally be formed of one or more coaxial layers of insulating material with an electrostatic shield therebetween.

The apparatus of the present invention for selectively removing a portion of the casing is broadly depicted in FIG. 1 by the reference numeral 10; and, as subsequently described, is effective to initially sever a substantial thickness of the casing 2 at the circumferential location 2a at a prescribed distance from the end of the cable, and thereafter strippably remove the so-severed end portion 2b, thereby exposing the conductors 3.

It is significant to point out at this time that the initial severence of the casing at the location 2a need not, and normally would not, involve cutting through the entire thickness of the casing 2; it only being necessary to score or sever the casing a sufficient amount to facilitate the subsequent stripping of the end portion 2b therefrom. Thus, the apparatus of the present invention can be designed without the requirement of precise tolerances for the severing operation and can also accommodate non-concentricity of the cables themselves.

Furthermore, while the apparatus 10 is suited to so strip the outer insulating casing from the ends of cables of essentially any size, the apparatus would typically be used in conjunction with cables having outside diameters ranging from approximately 0.6 to 0.9 inches.

The apparatus 10 comprises a first stationary cable clamping assembly 11 and a second cable clamping assembly 12 mounted for reciprocal translation along a set of parallel guide rails 13, the assemblies 11 and 12 being operative to releasably clamp the end of cable 1 inserted therethrough. As depicted, the cable clamping assemblies are supported at a convenient height on a bench or table 14 having ground engaging legs 15.

As subsequently described in greater detail, the end of the electrical cable 1 is inserted into the assemblies 11 and 12 when they are in the relative positions depicted in FIG. 1, where the cable end is clamped in place, the assembly 12 also substantially severing the casing at the location 2a as a result of its clamping action. The assembly 12 is thereafter translated in the axial direction of the clamped cable and away from the assembly 11 to strippably remove the so-severed or scored end portion 2b.

The length of the severed portion 2b (and consequently the degree of conductor exposure) is dependent upon the extent of insertion of the cable through the adjacent assemblies 11 and 12. To assist in the accurate positioning of the cable end, a block 16 may be mounted at the entrance to assembly 11, a predetermined point along the cable length then being manually aligned with the edge 16a of the block. Alternatively, it may be desirable to utilize automatic alignment and registry means to control the extent of cable insertion into assemblies 11 and 12.

The actuation of the assemblies 11 and 12 to alternately clamp and unclamp the cable 1 and the advancement and return of the clamping assembly 12 is automatically and sequentially controlled. While various means, including electronic systems, may be employed for effecting this sequencing and control, in accordance with a preferred embodiment hereof, the operation of the apparatus is carried out pneumatically by a system which includes primary and reservoir air tanks or cylinders 18 and 19 in fluid communication (by way of conduits 20) with each other and with air cylinders 21a and 21b respectively associated with the assemblies 11 and 12; associated valves and valve controls (not shown); and a foot treadle 23 for releasing air in the system to initiate the overall operating cycle of the apparatus.

In addition, piston rod 22 (FIGS. 4 – 7) operatively associated with the main cylinder 18 and connected to the assembly 12 is effective to drive the clamping assembly to and from its initial location adjacent assembly 11, the extent of such travel away from the assembly 11 (as well as the actuation of assemblies 11 and 12 to release the cable from clamping) being controlled by the operative engagement of a microswitch assembly 17.

Referring now to FIG. 2, the cable clamping assembly 11 is defined by an inverted generally U-shaped frame 30 having its opposed leg portions 30a suitably secured by fasteners 31 to a channel-shaped base 32 having ends 32a and a channel 32b extending through the base portion and open to the front and rear thereof. The base 32 of assembly 11 (and consequently the entire assembly 11) is rigidly mounted to the top of the table 14 and includes extensions 32c in which the ends of guide rails 13 are rigidly secured.

The air cylinder 21a is mounted at the apex of the frame 30 with its operatively coupled ram or plunger 33 extending through the frame 30 and threadably connected through jam nut 35 to an upper carrier assembly 34 mounted for vertical translation within the confines of the frame 30. Thus, actuation of the double-acting air cylinder 21a alternately ejects and withdraws the ram 33 to respectively lower and raise the carrier assembly 34 to and from engagement with base 32.

Removably disposed between the end portions 32a of the base 32 is a lower jaw member 36 having a semicircular recessed surface portion 36a. An upper jaw member 37 is removably connected between ends of the upper carrier assembly 34 and also has a semicircular recessed surface portion 37a mutually aligned with the surface portion 36a. Thus, and as may be apparent, when the carrier assembly 34 is lowered in response to the actuation of the cylinder 21a (ejection of plunger 33), the jaw members 36 and 37 cooperate to rigidly clamp their surface portions 36a and 37a around the circumference of the inserted cable 1, annular ridges 38 being provided at these surface portions to assist in the retention of the cable.

In accordance with a unique feature hereof, the clamping assembly 11 also includes a pair of ejector pin carrier frames 40 and 41 respectively disposed at the front (cable entrance) and rear (cable exit) of the assembly. Each frame is mounted so as to "float" with the assembly and for this purpose includes a pair of parallel spaced guide rods 42 adapted for slideable movement through sets of vertically aligned holes 43 and 44 in the carrier assembly 34 and base portion ends 32a, the top and bottom bars 39a and 39b freely translated in the space adjacent carrier 34 and channel 32b, respectively. It is also to be noted that the pair of rods 42 provide the alignment and guidance for the vertical movement of the upper carrier assembly 34.

Each frame carries a set of exposed extending ejector pins 45 and 46 adapted to respectively extend through mutually aligned openings 47 and 48 within the upper and lower jaw members. As subsequently described in greater detail, when the carrier assembly 34 has been actuated to its uppermost (or unclamped) position, the ejector pins assist in the release of the cable from the clamping jaw assembly.

The cable clamping assembly 12 is depicted in FIG. 3 and, for the most part, is of essentially the same construction and design as the previously described clamping assembly 11. Thus, and to avoid needless repetition, those parts of clamping assembly 12 which are of the same construction and operation as those parts of clamping assembly 11 bear the same reference numerals in FIG. 3 as those parts referenced in and previously described with reference to FIG. 2. In addition, however, the base 32 of the clamping assembly 12 has a carriage extension 50 which extends downwardly through an opening 14a in the top of table 14 (FIG. 1), opposed slots 51 being provided in the extension 50 to slideably receive the edges 14b of the table top at the opening 14a. Furthermore, the pair of guide rails 13 are slideably received within openings in the extensions 32c of assembly 12 (within linear bearings 90) with the elongated piston rod 22 being rigidly attached within the extension 50.

Respectively secured to the jaw members 36 and 37 at the front (cable entrance) of the assembly 12 are blade carriers 60 and 61, each of these blade carriers including a semicircular cutting blade so aligned with one another and with the adjacent semicircular surface portions 36a and 37a that when the upper carrier assembly 34 is translated to its lowermost or "clamped" position (thereby to clamp the segment 2b) the opposed cutting blades effectively sever a substantial thickness of the outer casing 2 at the location 2a.

It has been found that the effective operation of the clamping assemblies requires that the U-shaped frame 30 maintain its shape during the clamping and unclamping operations. This can be achieved by constructing the frame of sufficiently rigid material or, alternatively, providing support rods joining the opposed leg portions 30a, thus preventing deformation of the frame during operation.

There is now described the overall operation of the apparatus 10. Accordingly, prior to the initiation of the operating cycle, the clamping assembly 12 is positioned adjacent the clamping assembly 11 and the upper carrier 34 of both assemblies are in their uppermost or "unclamped" positions, as shown in FIG. 1. The end of the cable 1 is then inserted the desired extent into the assemblies 11 and 12 where it is supported within the semicircular recess 36a of each of the lower jaw members 36.

The operating cycle (FIGS. 4 – 7) of the apparatus is initiated by the depression of the foot treadle 23 which then actuates the air cylinders 21a and 21b to lower each carrier assembly 34 into engagement with the base 32 (FIG. 4), the cable thus being securely clamped by the cooperating jaw members 36 and 37. Simultaneously, and as a consequence of the clamping action of the assembly 12, the outer casing 2 is substantially scored or severed by the cooperating blades at the location 2a.

Figure 5:
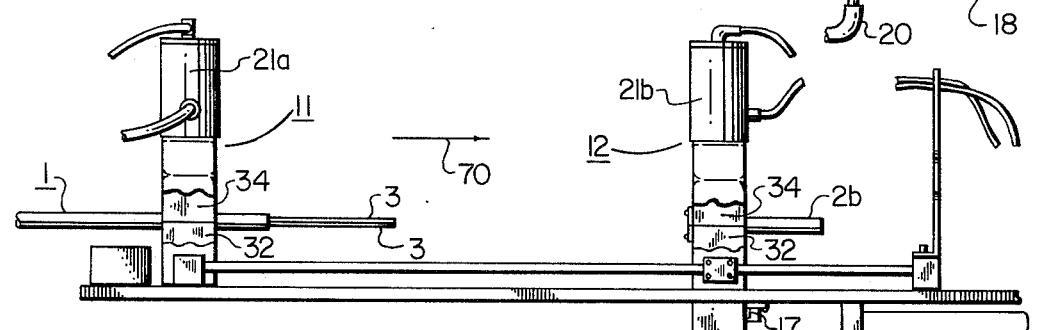

Shortly thereafter, the air cylinder 18 withdraws the piston rod 22, thereby advancing the carriage assembly 12 in the direction of the arrow 70 until extension 50 engages the microswitch assembly 17 (FIG. 5). As a consequence of this advancement, and due to the fact that the clamping assemblies are still in their "clamped" position, the substantially severed end 2b of the cable insulating casing is stripped from the cable, thus exposing the conductors 3.

When the microswitch 17 is engaged by the carriage extension 50, the air cylinders 21a and 21b are again actuated resulting in the upper carriers 34 of both assemblies 11 and 12 being elevated to their uppermost position (FIG. 6), thus releasing the cable 1 and the strip 2b. The elevation of the carrier assemblies 34 also lifts the floating pin carrier frames 40 and 41 (the position of the pin carrier frames of assembly 12 in this condition being depicted in FIG. 3) where, as a consequence, the upper and lower ejector pins 45 and 46 extend entirely through the respective jaw members, thus aiding in the release of the cable and strip 2b.

Figure 6:
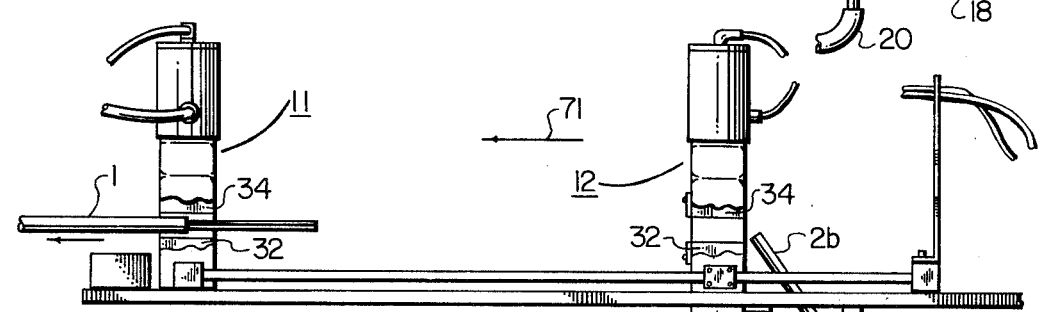
Figure 7:
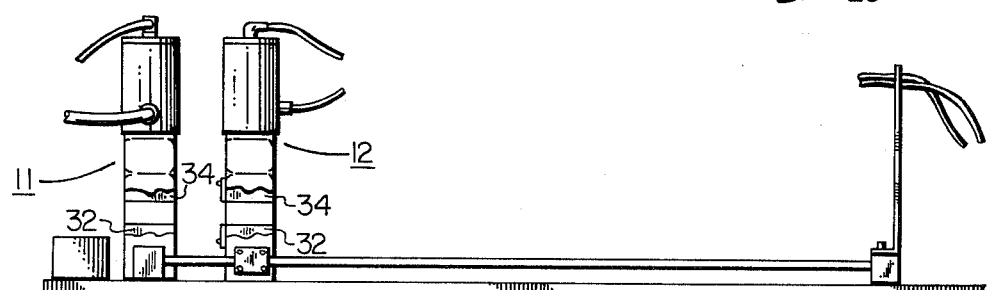

Thereafter, and as shown in FIG. 6, the cylinder 18 ejects the piston rod 22 to return the assembly 12 in the direction of arrow 71, the strip 2b consequently being ejected from the assembly, during which time the stripped cable 1 is withdrawn from the clamping assembly 11. The carriage assembly 12 is then returned to its original position adjacent assembly 11 (FIG. 7), and the operating cycle of the apparatus is completed.

It is thus apparent that the apparatus of the present invention is effective to automatically and quickly remove the desired length of insulating casing from the cable end. Various diameter cables may be accommodated by the apparatus since the jaw members 36, 37 (and blade carriers 60, 61) are removable and may be replaced with clamping jaws (and cutter blades) of suitable size and radii.

Various modifications of the disclosed embodiment, as well as additional embodiments, may become apparent to those skilled in the art after reviewing the foregoing description without departing from the spirit and scope of the invention as defined by the following claims.

We claim:
1. Apparatus for removing a defined portion of the outer insulating casing from an electrical cable, comprising:
    a. first and second cable clamping assemblies for releasably clamping an end of said electrical cable,
    b. means for supporting said cable clamping assemblies at a desired height, said first cable clamping assembly being stationary with respect to said support means, said second cable clamping assembly mounted for reciprocal translation from and toward said first cable clamping assembly in the axial direction of the cable clamped within said cable clamping assemblies,
    c. each of said cable clamping assemblies comprising:
        i. upper and lower carrier assemblies, one of said carrier assemblies being fixed, the other carrier assembly being mounted for vertical translation toward and away from engagement with said fixed carrier assembly,
        ii. first and second jaw members respectively removably connected with said upper and lower carrier assemblies and having mutually aligned semi-circular shaped recessed surface portions for clamping retention of said cable end when said other carrier assembly is translated toward engagement with said fixed carrier assembly, and
        iii. a pair of laterally spaced pin carrier frames carried by said upper and lower carrier assemblies, each of said frames defined by upper and lower horizontal frame members joined by vertically extending rod means extending through, and slidably mounted with, said upper and lower carrier assemblies, and opposed ejector pins respectively extending from said upper and lower horizontal frame members and aligned with vertically extending channels in said first and second jaw members, whereby the vertical translation of the other carrier assembly away from engagement with said fixed carrier assembly is effective to engage said upper and lower horizontal frame members with said upper and lower carrier assemblies to drive said opposed ejector pins through said channels, thereby to assist in the release of said cable end from clamping retention by said recessed surfce portions,
    d. said second cable clamping assembly additionally having blade means for severing a substantial thickness of said outer insulating casing when the carrier assembly of said second cable clamping assembly is vertically translated toward engagement with the fixed carrier assembly of said second cable clamping assembly, and
    e. means for automatically and sequentially actuating the said other carrier assembly of both said first and second cable clamping assemblies initially toward engagement with the fixed carrier assemblies thereof, then translating said second cable clamping assembly in said axial direction away from said first cable clamping assembly, and thereafter actuating said other carrier assemblies away from engagement with said fixed carrier assemblies and translating said second cable clamping assembly in said axial direction toward said first cable clamping assembly.

2. The apparatus as defined by claim 1 further comprising guide rails along which said second cable clamping assembly is reciprocally translated, switch means for limiting the extent of said translation from said first cable clamping assembly, and means connected with said second cable clamping assembly for engaging said switch means.

* * * * *